United States Patent
Kageyama et al.

(10) Patent No.: US 9,139,107 B2
(45) Date of Patent: Sep. 22, 2015

(54) DEVICE FOR IMPROVING VEHICLE BEHAVIOR WHEN STEERING

(75) Inventors: Yusuke Kageyama, Isehara (JP);
Takeshi Kimura, Yokohama (JP);
Yosuke Kobayashi, Yokohama (JP);
Yuuki Shiozawa, Sagamihara (JP);
Toshiyuki Murata, Zama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 13/642,710

(22) PCT Filed: Apr. 13, 2011

(86) PCT No.: PCT/JP2011/059175
§ 371 (c)(1),
(2), (4) Date: Oct. 22, 2012

(87) PCT Pub. No.: WO2011/136025
PCT Pub. Date: Nov. 3, 2011

(65) Prior Publication Data
US 2013/0041541 A1 Feb. 14, 2013

(30) Foreign Application Priority Data
Apr. 28, 2010 (JP) ................. 2010-102931

(51) Int. Cl.
*B60L 15/30* (2006.01)
*B60W 10/04* (2006.01)
(Continued)

(52) U.S. Cl.
CPC .......... *B60L 15/2036* (2013.01); *B60W 30/045* (2013.01); *B60W 30/18145* (2013.01); *B60W 2540/18* (2013.01); *B60W 2720/30* (2013.01); *Y02T 10/7275* (2013.01)

(58) Field of Classification Search
CPC ... B60L 15/2036; B60W 10/04; B60W 10/08; B60W 30/025; B60W 30/045; B60W 30/18145; B60W 2520/18; B60W 2540/18; B60W 2720/30

USPC ................... 701/37, 38, 41; 280/5.5
See application file for complete search history.

(56) References Cited

U.S. PATENT DOCUMENTS 5,197,008 A * 3/1993 Itoh et al. ........................ 701/70
5,508,919 A 4/1996 Suzuki et al.
(Continued)

FOREIGN PATENT DOCUMENTS

| CN | 1676974 A | 10/2005 |
| CN | 1966333 A | 5/2007 |

(Continued)

OTHER PUBLICATIONS

Kawashima et al., Rolling Stability Control of In-wheel Electric Vehicle Based on Two-Degree of Freedom Control, Jan. 17, 2008, University of Tokyo Department of Electrical Engineering.*

(Continued)

*Primary Examiner* — Fadey Jabr
*Assistant Examiner* — Thomas Ingram
(74) *Attorney, Agent, or Firm* — Foley & Lardner LLP (57) ABSTRACT

A steered condition vehicle behavior improving apparatus is provided for a vehicle, wherein the vehicle is capable of running with a road wheel driven by a driving force from a power source. The steered condition vehicle behavior improving apparatus includes a steering operation detecting means and a driving force reducing means. The steering operation detecting means detects a steering operation of steering a steerable wheel of the vehicle. The driving force reducing means temporarily reduces the driving force to the road wheel a set time period after the steering operation is detected by the steering operation detecting means.

13 Claims, 6 Drawing Sheets

(51) Int. Cl.
*B60W 10/18* (2012.01)
*B60W 30/02* (2012.01)
*B60W 30/045* (2012.01)
*B60W 30/18* (2012.01)
*B60L 15/20* (2006.01)

(56) References Cited

U.S. PATENT DOCUMENTS

| | | | |
|---|---|---|---|
| 6,092,012 | A | 7/2000 | Shimizu |
| 6,208,921 | B1 | 3/2001 | Tsunehara et al. |
| 7,264,077 | B2 | 9/2007 | Mori et al. |
| 7,703,561 | B2 | 4/2010 | Miyajima et al. |
| 7,813,853 | B2 | 10/2010 | Tomida |
| 2003/0201131 | A1 | 10/2003 | Maekawa et al. |
| 2005/0217921 | A1* | 10/2005 | Mori et al. .................. 180/433 |
| 2006/0173584 | A1* | 8/2006 | Einig et al. .................. 701/1 |
| 2007/0156314 | A1 | 7/2007 | Tomida |
| 2009/0236905 | A1 | 9/2009 | Maeda et al. |
| 2011/0231052 | A1* | 9/2011 | Ellis et al. .................. 701/29 |
| 2012/0185142 | A1* | 7/2012 | Meyers et al. .................. 701/70 |
| 2013/0041542 | A1 | 2/2013 | Kageyama et al. |

FOREIGN PATENT DOCUMENTS

| | | |
|---|---|---|
| JP | 07-132720 A | 5/1995 |
| JP | 09-058444 A | 3/1997 |
| JP | 10-086705 A | 4/1998 |
| JP | 10-287262 A | 10/1998 |
| JP | 2007-170590 A | 7/2007 |

OTHER PUBLICATIONS

NHTSA FMVSS No. 126 Electronic Stability Control Systems, Mar. 2007, National Highway Transportation Safety Administration.*
Kawashima et al., Rolling Stability Control Based on Electronic Stability Program for In-wheel-motor Electric Vehicle, May 2009, EVS24.*
Y. Kageyama et al., USPTO Non-final Office Action U.S. Appl. No. 13/642,716 dated May 30, 2014, (15 pgs.).
Chinese Office Action dated Aug. 29, 2014, 6 pgs.
Chinese Office Action dated Jun. 5, 2014, 7 pgs.
Y. Kageyama et al., USPTO Non-final Office Action U.S. Appl. No. 13/642,716 dated Jan. 30, 2015 (16 pgs.).
1 Y. Kageyama et al., USPTO Non-Final Office Action issued in 13/642,716, dated May 22, 2015.

* cited by examiner

DEVICE FOR IMPROVING VEHICLE BEHAVIOR WHEN STEERING

TECHNICAL FIELD

The present invention relates to apparatus for improving steered condition behavior, specifically, yawing behavior and/or rolling behavior, of a vehicle, wherein the vehicle is capable of running with a road wheel driven by a driving force from a power source.

BACKGROUND ART

In recent years, a sprung weight of a vehicle tends to increase, wherein the sprung weight is on an upper side of a suspension device of the vehicle, for some reasons, wherein the reasons include a reason that there is a demand for low fuel consumption so that a fuel saving tire with a small rolling resistance is employed, and a fuel efficiency improving device is added, and a battery of a large capacity is required accordingly. Adoption of a fuel-saving tire leads to a decrease in friction coefficient between tire and road surface, whereas increase in sprung weight leads to an increase in suspension stroke.

Both of decrease in road surface friction coefficient and increase in suspension stroke tend to make yawing behavior of a vehicle have a nonlinear characteristic when steering operation is performed to steer steerable wheels, wherein the yawing behavior is around a vertical axis passing through the center of mass of the vehicle. Especially for an electric vehicle which is powered only by an electric motor as a power source, the nonlinear characteristic of yawing behavior is significant, because such an electric vehicle is provided with a large and heavy battery at a central place under a floor of a vehicle body. Moreover, increase in suspension stroke causes an increase in rolling motion of the vehicle that is a behavior of inclination around a longitudinal axis of the vehicle body.

For improvement of yawing behavior having a nonlinear characteristic, it is conceivable that suspension rigidity is enhanced by use of a high rigidity elastic bush or high rigidity insulator at a part to which the suspension device is attached, according to a technique as described in a patent document 1. On the other hand, for suppression of vehicle body rolling, it is conceivable that oscillation damping performance of a shock absorber of the suspension device is enhanced, for example, by use of a technique as described in a patent document 2.

However, the countermeasure of enhancing the suspension rigidity or the countermeasure of increasing the damping performance of the shock absorber causes an increase of spring coefficient of the suspension device, and thereby causes a new problem about oscillation and noise. Moreover, the countermeasure of increasing the damping performance of the shock absorber requires to provide the shock absorber with an additional damping force adjusting mechanism, and to add an actuator and others for actuating the damping force adjusting mechanism, and thereby causes a demerit of cost-up.

PRIOR ART DOCUMENT(S)

Patent Document(s)

Patent Document 1: JP 07-132720 A
Patent Document 2: JP 2007-170590 A

SUMMARY OF THE INVENTION

In view of the foregoing, it is an object of the present invention to propose a steered condition vehicle behavior improving apparatus capable of improving yawing behavior and/or rolling behavior of a vehicle during steering operation, without causing a change in suspension rigidity or damping performance of a shock absorber, namely, without causing a new problem about oscillation and noise by increasing the spring coefficient of a suspension device, and without causing a problem of cost rise by adding a damping force adjusting mechanism and others.

For that object, according to the present invention, a steered condition vehicle behavior improving apparatus for a vehicle, wherein the vehicle is capable of running with a road wheel driven by a driving force from a power source, the steered condition vehicle behavior improving apparatus is characterized by comprising: a steering operation detecting means that detects a steering operation of steering a steerable wheel of the vehicle; and a driving force reducing means that temporarily reduces the driving force to the road wheel a set time period after the steering operation is detected by the steering operation detecting means.

With the steered condition vehicle behavior improving apparatus according to the present invention, the problem described above that the yawing behavior of the vehicle becomes nonlinear can be solved, because the temporary increase of the driving force to the road wheel when the set time period has elapsed after the detection of steering operation, causes an increase in restoring moment of the steerable wheel and a decrease in the lateral force of the steerable wheel after the set time period has elapsed, and thereby suppresses changes of the yaw rate of the vehicle when steering operation is performed.

Moreover, according to the present invention, the feature of temporarily reducing the driving force to the road wheel the set time period after the steering operation is detected, serves to increase the rolling speed of the vehicle in response to wheel load change after the set time period has elapsed, and thereby increase the damping performance by increase of the stroked speed of the shock absorber, and suppress the rolling motion, and thereby solve the problem of increase of the rolling behavior, and enhance the rolling feel of the vehicle immediately after steering operation.

Furthermore, according to the present invention, it is possible to improve the vehicle behavior when steering operation is performed, without causing a change in suspension rigidity or the damping performance of a shock absorber, namely, without causing a new problem about oscillation and noise by increasing the spring coefficient of the suspension device, and without causing a problem of cost rise by adding a damping adjusting mechanism and others.

BRIEF DESCRIPTION OF THE DRAWINGS

FIG. 3 is a time chart of operation of the steered condition vehicle behavior improving control of FIG. 2, wherein

FIG. 8 is a time chart of operation of the steered condition vehicle behavior improving control of FIG. 2, wherein

MODE(S) FOR CARRYING OUT THE INVENTION

The following describes modes for carrying out the present invention with reference to an embodiment shown in the drawings.

Figure 1:
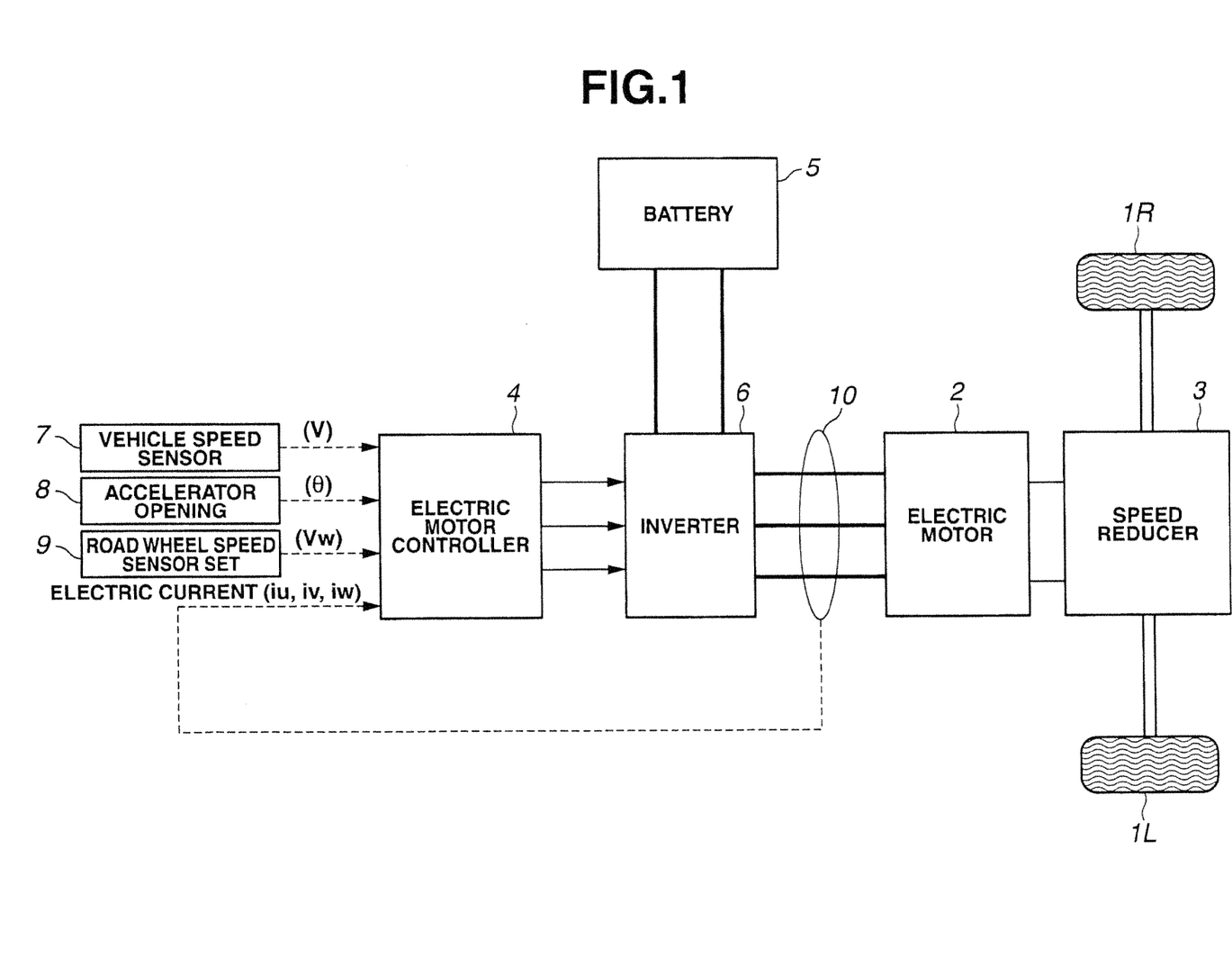
FIG. 1 is a schematic system diagram showing a drive system of a vehicle and a control system for the drive system, wherein the vehicle is provided with a steered condition vehicle behavior improving apparatus according to an embodiment of the present invention.

<Configuration> FIG. 1 is a schematic system diagram showing a drive system of a vehicle and a control system for the drive system, wherein the vehicle is provided with a steered condition vehicle behavior improving apparatus according to an embodiment of the present invention. In the embodiment, the vehicle of FIG. 1 is an electric vehicle that is capable of running with left and right front wheels 1L, 1R driven, wherein left and right front wheels 1L, 1R are steerable wheels. The driving of left and right front wheels 1L, 1R is implemented by driving the left and right front wheels 1L, 1R by an electric motor 2 as a power source through a speed reducer 3, wherein speed reducer 3 includes a differential gear.

Driving force of electric motor 2 is controlled by an electric motor controller 4 which performs DC-AC conversion from power of a battery 5 as a power supply by an inverter 6, and supplies the AC power to electric motor 2 under control of inverter 6, so as to conform the torque of electric motor 2 to a target motor torque as a result of calculation obtained by electric motor controller 4.

If the target motor torque as a result of calculation obtained by electric motor controller 4 is of a negative polarity which requests regenerative braking operation of electric motor 2, then electric motor controller 4 applies a load of generation to electric motor 2 through inverter 6, and performs AC-DC conversion from the power generated by regenerative braking operation of electric motor 2, and charges battery 5.

Electric motor controller 4 receives input of information used to calculate the target motor torque described above. The information includes a signal from a vehicle speed sensor 7 that detects a vehicle speed V that is a speed of the electric vehicle with respect to ground, and a signal from an accelerator opening sensor 8 that detects an accelerator opening θ (electric motor requested load) made by driving operation, and a signal from a road wheel speed sensor set 9 that detects individual road wheel speeds Vw of left and right front wheels 1L, 1R and left and right rear wheels not shown, and a signal from an electric current sensor 10 that detects electric currents of electric motor 2 (electric currents iu, iv, iw in FIG. 1, for creating three-phase alternating currents composed of U-phase, V-phase, and W-phase).

Electric motor controller 4 generates a PWM signal for controlling the electric motor 2 based on the above information, and generates a drive signal for inverter 6 through a drive circuit based on the PWM signal. For example, inverter 6 is composed of two switching elements (for example, power semiconductor elements such as IGBTs) for each phase, and supplies a desired current to electric motor 2 while turning ON/OFF the switching elements according to the drive signal and performing conversion from the direct current supplied from battery 5 to AC and reverse conversion.

Electric motor 2 generates a driving force based on the AC current supplied from inverter 6, and transmits the driving force to left and right front wheels 1L, 1R (left and right steerable wheels) through speed reducer 3. While the vehicle is running so that electric motor 2 is dragged by left and right front wheels 1L, 1R, i.e. electric motor 2 is in the so-called state of inverse drive, electric motor 2 is applied with a load of generation to perform regenerative braking operation, and regenerate the kinetic energy of the vehicle, and charge the battery 5.

Figure 2:
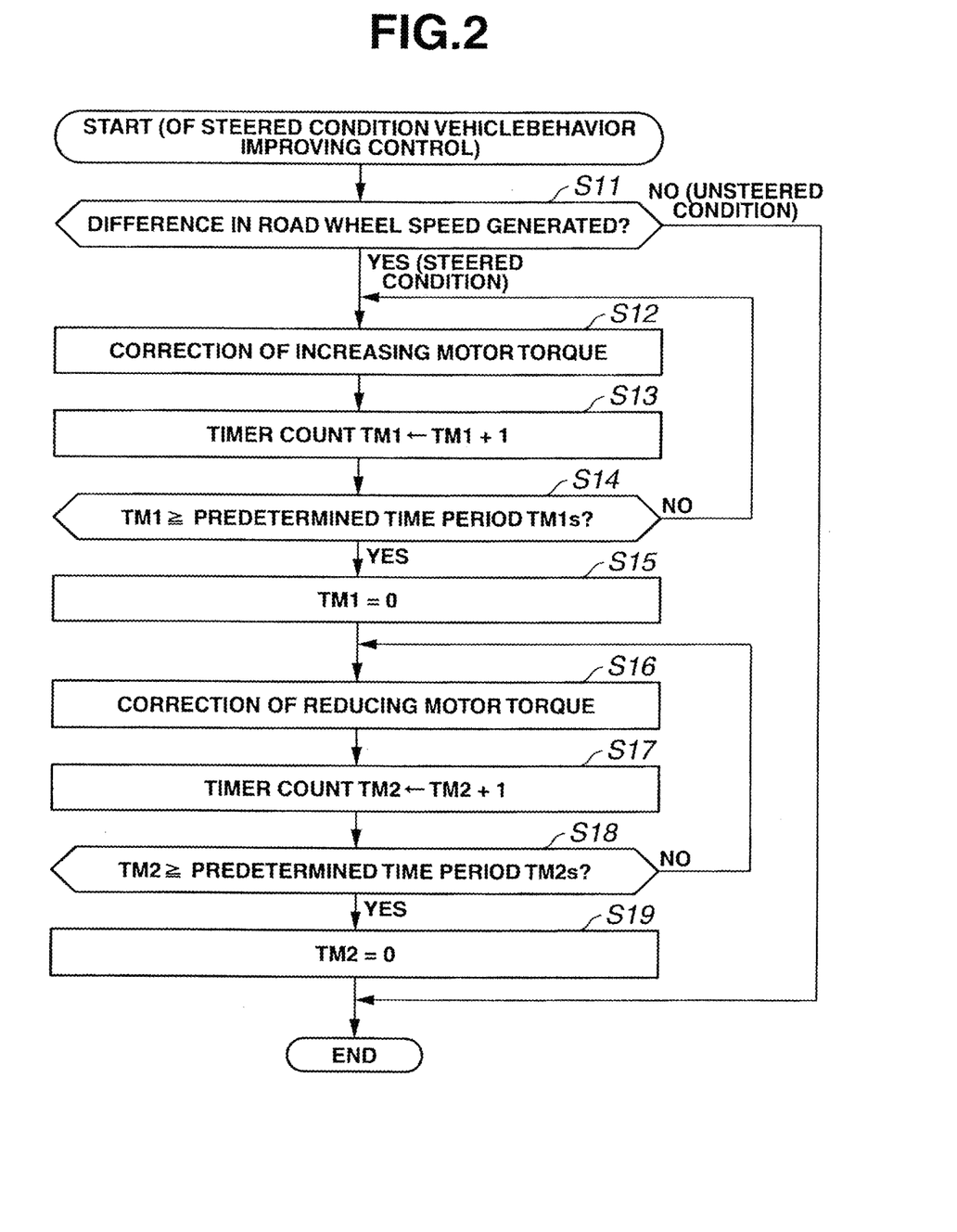
FIG. 2 is a flow chart showing a steered condition vehicle behavior improving program executed by an electric motor controller in FIG. 1.

<Steered Condition Vehicle Behavior Improving Control>
Electric motor controller 4 executes a control program shown in FIG. 2, and performs a steered condition vehicle behavior improving control through driving force control for electric motor 2.

At Step S11, electric motor controller 4 checks whether or not steering operation of steering left and right front wheels 1L, 1R is performed, by determining, based on road wheel speed Vw of each road wheel detected by road wheel speed sensor set 9, whether or not a difference in road wheel speed between left and right front wheels 1L, 1R, or a difference in road wheel speed between front and rear wheels not shown, namely, a difference between an average road wheel speed of left and right front wheels 1L, 1R and an average road wheel speed of left and right rear wheels not shown, is above a threshold for determining steering operation. Accordingly, Step S11 corresponds to a steering operation detecting means in the present invention.

Under non-steering operation condition in which it is determined that the difference in road wheel speed is smaller than a set value, it is unnecessary to perform the steered condition vehicle behavior improving control, so that electric motor controller 4 exits from the control program of FIG. 2. Under steering operation condition in which it is determined that the difference in road wheel speed is greater than or equal to the set value, it is necessary to perform the steered condition vehicle behavior improving control, so that electric motor controller 4 proceeds to Step S12 and the following steps in which electric motor controller 4 performs the steered condition vehicle behavior improving control through the driving force control of electric motor 2 as follows.

Figure 3A:
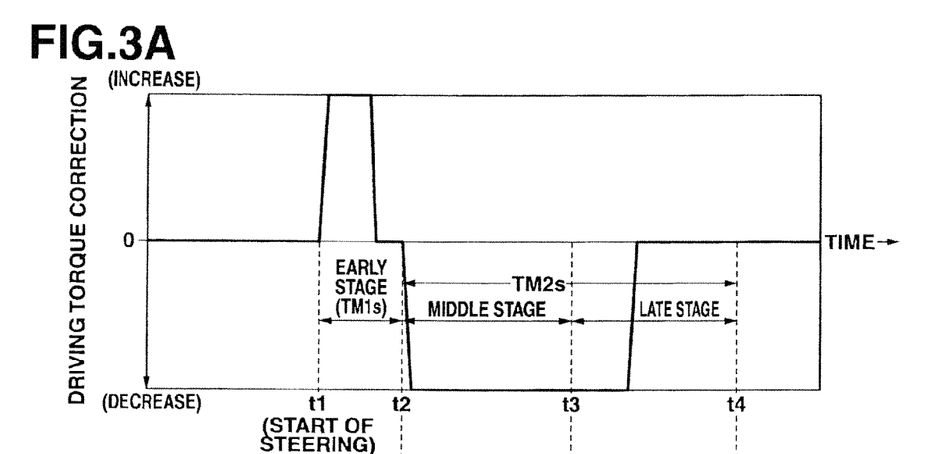
FIG. 3A is a time chart showing a change in time of driving torque correction.

At Step S12, electric motor controller 4 performs a motor torque increasing correction of correcting a target motor torque by an increment of a driving torque correction immediately after a time instant t1 when steering operation is started as represented by a solid waveform in FIG. 3A, wherein the target motor torque of electric motor 2 is determined based on vehicle speed V and accelerator opening APO by using a prepared motor torque map.

At the following Step S13, electric motor controller 4 increments a timer count TM1, and thereby measures a time period elapsed after time instant t1 when the motor torque increasing correction is started (when steering operation is started). At Step S14, electric motor controller 4 checks whether or not timer count TM1 indicates a predetermined time period TM1s, namely, whether or not a time instant t2 in FIG. 3A is reached after the predetermined time period TM1s has elapsed after time instant t1 when the motor torque increasing correction is started (when steering operation is started).

Figure 3B:
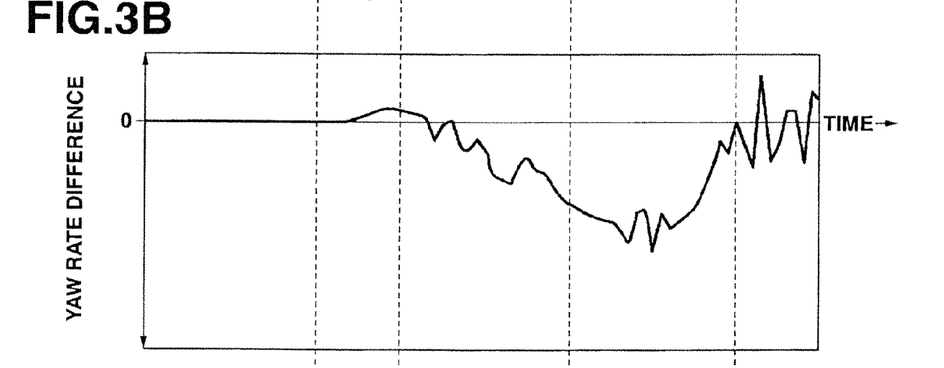
FIG. 3B is a time chart showing a change in time of difference of yaw rate.

Until it is determined at Step S14 that TM1≥Tm1s (time instant t2 in FIG. 3 is reached after the predetermined time period TM1s has elapsed from time instant t1 when the motor torque increasing correction is started), electric motor controller 4 returns the control to Steps S12 and S13 so that electric motor controller 4 continues the motor torque increasing correction based on the solid line waveform in FIG. 3A at Step S12, and measures the continuation time period of the motor torque increasing correction at Step S13.

At time instant t2 in FIG. 3A when it is determined at Step S14 that TM1≥Tm1s (the motor torque increasing correction is performed just for the predetermined time period TM1s), electric motor controller 4 advances the control to Steps S15 to S17. At Step S15, electric motor controller 4 resets the timer count TM1 for next execution. At Step S16, electric motor controller 4 performs a motor torque reducing correction of correcting the target motor torque by a decrement of driving torque correction immediately after time instant t2 when the motor torque increasing correction is terminated as represented by the solid waveform in FIG. 3A. Accordingly, Step S16 corresponds to a driving force reducing means in the present invention. At the following Step S17, electric motor controller 4 increments a timer count TM2, and thereby measures a time period elapsed after time instant t2 when the motor torque reducing correction is started.

At Step S18, electric motor controller 4 checks whether or not timer count TM2 indicates a predetermined time period TM2s, namely, whether or not a time instant t4 in FIG. 3A is reached after the predetermined time period TM2s has elapsed after time instant t2 when the motor torque reducing correction is started. Until it is determined at Step S18 that TM2 Tm2s (time instant t4 in FIG. 3 is reached after the predetermined time period TM2s has elapsed after time instant t2 when the motor torque reducing correction is started), electric motor controller 4 returns the control to Steps S16 and S17 so that electric motor controller 4 continues the motor torque reducing correction based on the solid line waveform in FIG. 3A at Step S16, and measures the continuation time period of the motor torque reducing correction at Step S17.

At time instant t4 in FIG. 3A when it is determined at Step S18 that TM2 Tm2s (the motor torque reducing correction is performed just for the predetermined time period TM2s), electric motor controller 4 advances the control to Step S19. At Step S19, electric motor controller 4 resets the timer count TM2 for next execution.

By the motor driving force control for electric motor 2 shown in FIG. 2, the motor torque is controlled to a value obtained by temporary increase represented by the solid line waveform in FIG. 3A relative to the target motor torque during a period from time instant t1 when steering operation is started to time instant t2 when the predetermined time period TM1s has elapsed after time instant t1 in FIG. 3A, and is controlled to a value obtained by temporary decrease represented by the solid line waveform in FIG. 3A relative to the target motor torque during a period from time instant t2 when the motor torque increasing correction is terminated to time instant t4 when the predetermined time period TM2s has elapsed after time instant t2 in FIG. 3A.

<Functions and Effects> The foregoing motor driving force control serves to improve steered condition vehicle behavior as follows.

Figure 4:
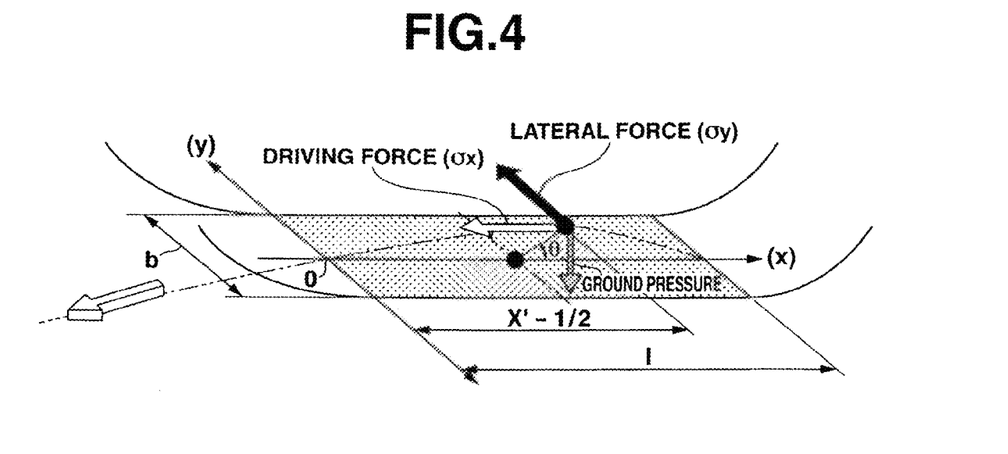
FIG. 4 is an explanation diagram showing specifications of a steerable wheel about tire contact surface.
Figure 5:
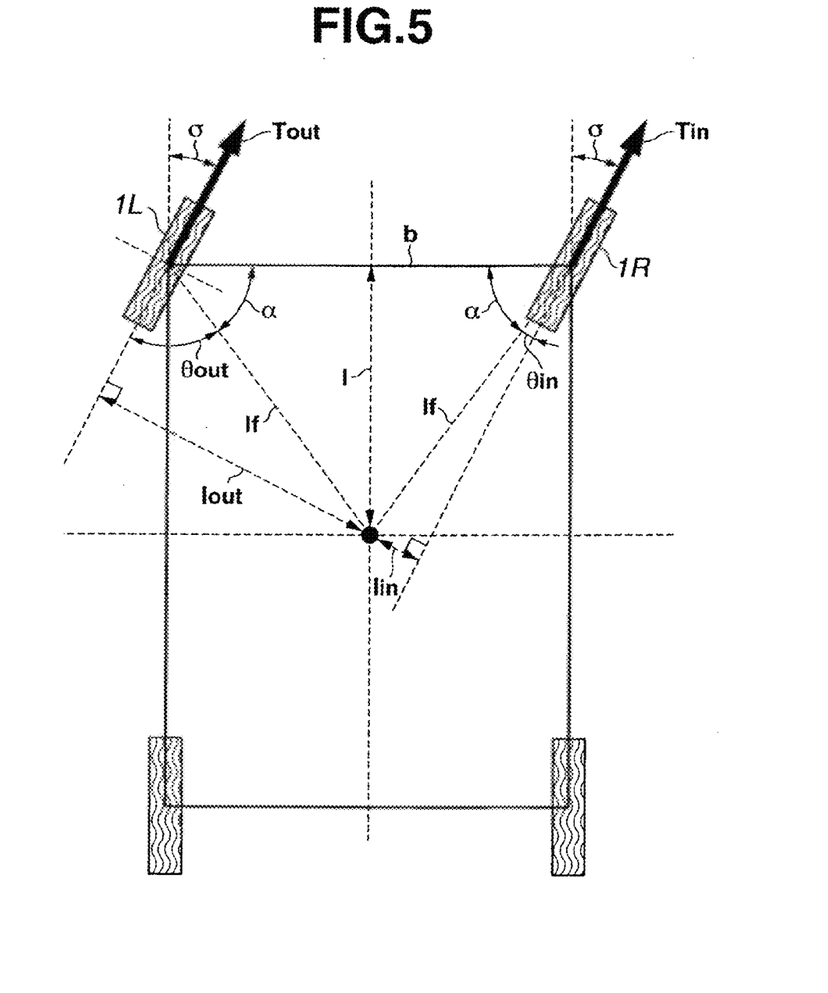
FIG. 5 is an explanation diagram showing specifications of the vehicle.

In a case where specifications about tire contact surface are as shown in FIG. 4 and specifications of the vehicle are as shown in FIG. 5, a cornering moment M generated by individual steerable wheel (front wheel) 1L, 1R can be determined by using the following equation by subtracting the second term of the right hand side of the equation from the first term of the right hand side of the equation, wherein the first term is a cornering moment resulting from a lateral force σy, and the second term is a cornering moment resulting from a longitudinal force σx.

$$M = b\left[\int_0^{x'}\left(x' - \frac{l}{2}\right)\sigma_y\,dx' + \int_{x'}^l\left(x' - \frac{l}{2}\right)(-\mu p\sin\theta)\,dx'\right] - \qquad \text{(Equation 1)}$$

$$b\left[\int_0^{x'} y\sigma_x\,dx' + \int_{x'}^l \frac{\mu p\sin\theta}{K_y}(-\mu p\cos\theta)\,dx'\right]$$

On the other hand, a cornering moment Mfr generated cooperatively by steerable wheels (front wheels) 1L, 1R can be determined by using the following equation based on a cornering-outside wheel cornering moment Mout and a cornering-inside wheel cornering moment (restoring moment) Min which can be determined by using the above equation.

$$M_{fr} = M_{out} - M_{in} \qquad \text{(Equation 2)}$$
$$= T_{out}l_{out} - T_{in}l_{in}$$
$$= T_{out}l_f\sin(90 + \sigma - \alpha) - T_{in}l_f\sin(90 - \sigma - \alpha)$$

Figure 3C:
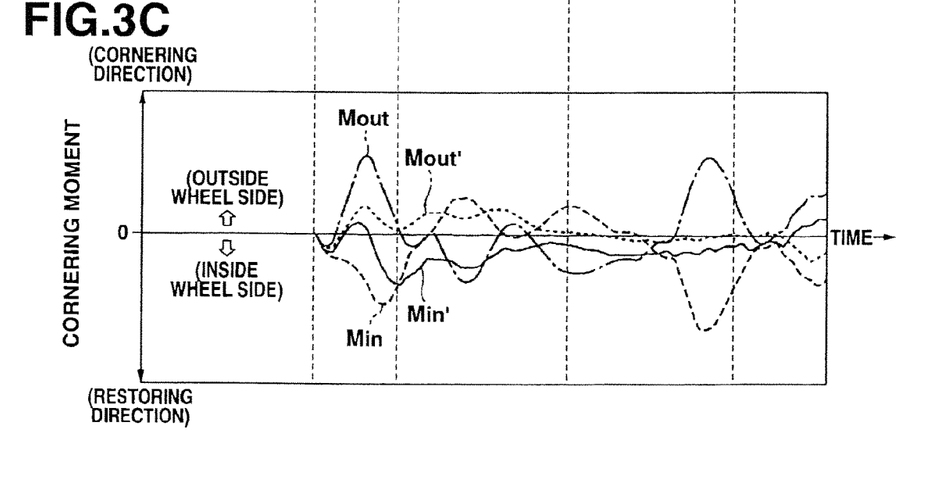
FIG. 3C is a time chart showing a change in time of cornering moment generated by each steerable wheel, in comparison with a case in which the steered condition vehicle behavior improving control of FIG. 2 is not performed.

When the steered condition motor driving force control of FIG. 2 is performed, the cornering-outside wheel cornering moment Mout and the cornering-inside wheel cornering moment (restoring moment) Min are as shown in FIG. 3C.

As compared to a cornering-outside wheel cornering moment Mout' for a case where the steered condition motor driving force control of FIG. 2 is not performed, the cornering-outside wheel cornering moment Mout is significantly increased larger by the motor torque increasing correction during the early stage from time instant t1 to time instant t2 as shown in FIG. 3C, and is made to have a more restoring tendency by the motor torque reducing correction during the middle stage from time instant t2 to time instant t3 and the late stage from time instant t3 to time instant t4.

On the other hand, as shown in FIG. 3C, the cornering-inside wheel cornering moment (restoring moment) Min for the case where the steered condition motor driving force control (motor torque increasing and reducing correction) of FIG. 2 is performed is not different very much from a cornering-inside wheel cornering moment (restoring moment) Min' for a case where this motor torque correction is not performed.

Figure 6:
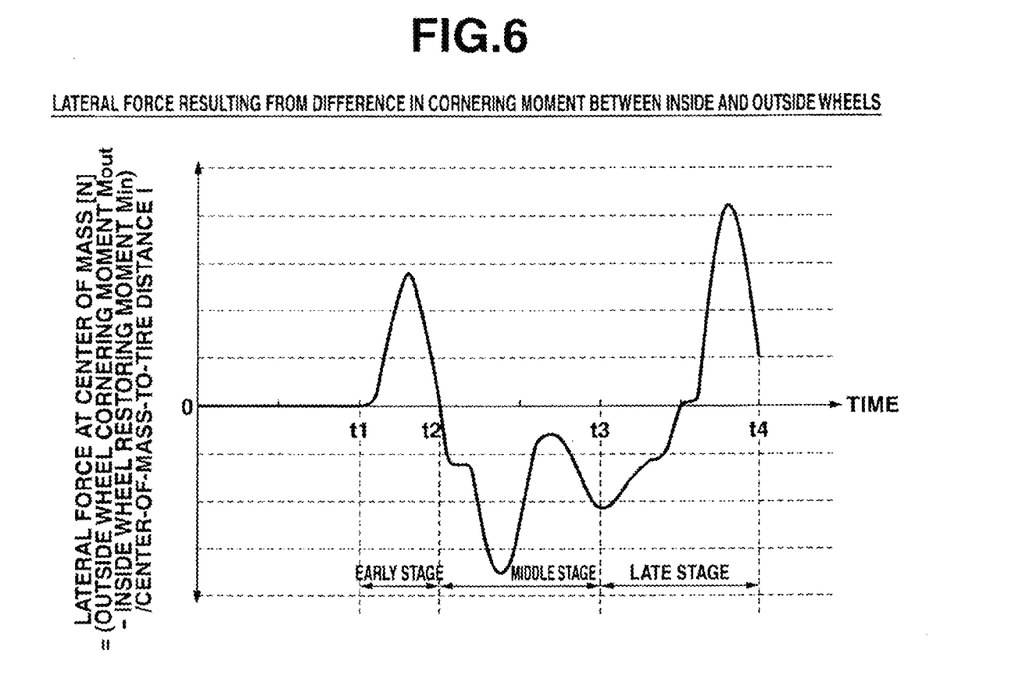
FIG. 6 is a time chart showing a change in time of a lateral force resulting from a difference in cornering moment between inside and outside wheels in a case where the steered condition vehicle behavior improving control of FIG. 2 is performed.

Accordingly, when the steered condition motor driving force control of FIG. 2 is performed, the cornering moment resulting from the difference between the cornering-outside wheel cornering moment Mout and the cornering-inside wheel cornering moment (restoring moment) Min becomes larger during the early stage from time instant t1 to time instant t2, and an apparent lateral force obtained by dividing (Mout−Min) by a center-of-mass-to-axle distance I is increased during the early stage from time instant t1 to time instant t2 as shown in FIG. 6. As a result, the difference in yaw rate of the vehicle quickly rises during the early stage from time instant t1 to time instant t2 as indicated by a solid line in FIG. 3B, so that the yaw rate can be raised without delay, and that the response of turning of front part of the vehicle when the vehicle is steered (or initial head-turning ability), namely, the steering response, can be significantly improved.

On the other hand, during the middle stage from time instant t2 to time instant t3 and during the late stage from time instant t3 to time instant t4, the cornering-outside wheel cornering moment Mout has a more restoring tendency than cornering-outside wheel cornering moment Mout' for the case where the steered condition motor driving force control of FIG. 2 is not performed, so that the restoring moment by steerable wheels 1L, 1R is increased and the apparent lateral force of the steerable wheels is reduced during the middle stage and during the late stage from time instant t2 to time instant t4 as shown in FIG. 6.

In this way, the large yaw rate change generated during steering operation of the vehicle (in the present embodiment, this tendency is strong because the yaw rate is quickly raised during the early stage from time instant t1 to time instant t2 as described above) can be suppressed, and thereby the yawing behavior of the vehicle can be made to have a linear characteristic. This serves to solve the problem described above that the yawing behavior of the vehicle is made to have a nonlinear characteristic, and allow the cornering behavior of the vehicle to return quickly to an original one.

In view of the foregoing functions and effects, the quantity of increase by the motor torque increasing correction performed during the early stage from time instant t1 to time instant t2 when the predetermined time period TM1s has elapsed after time instant t1 as shown in FIG. 3A needs to be large enough to achieve the object described above. However, naturally, the quantity of motor torque increasing correction is preferably set such that a passenger of the vehicle fails to perceive acceleration, and fails to feel uncomfortable. It is naturally preferable that the predetermined time period TM1s is set to a very short time period such as 0.1 second, which is a minimum required time period for which the motor torque increasing correction is requested to improve the steering response, so that the motor torque increasing correction is prevented from continuing after that period and producing adverse effects.

Moreover, the quantity of motor torque reducing correction performed during the middle and late stages from time instant t2 to time instant t4 when the predetermined time period TM2s has elapsed, as shown in FIG. 3A, needs to be large enough to achieve the object described above of suppressing the large yaw rate change generated during steering operation of the vehicle, so that the yawing behavior of the vehicle is made to have a linear characteristic, and to achieve an object of quickly returning the head turning ability enhanced in the early stage to a normal one. However, naturally, the quantity of motor torque reducing correction is preferably set such that a passenger of the vehicle fails to perceive deceleration, and fails to feel uncomfortable.

It is naturally preferable that the predetermined time period TM2s is set to a minimum time period such as 0.4 second required for making the yawing behavior have a linear characteristic and achieving the return of head turning ability by the motor torque reducing correction, to prevent the motor torque reducing correction from continuing after that period and producing adverse effects.

When the steered condition motor driving force control of FIG. 2 is performed, the following effects are produced in addition to the foregoing, as clearly shown in FIG. 7 and FIGS. 8A, 8B and 8C which show time charts under the same condition as FIGS. 3 and 6.

Figure 7:
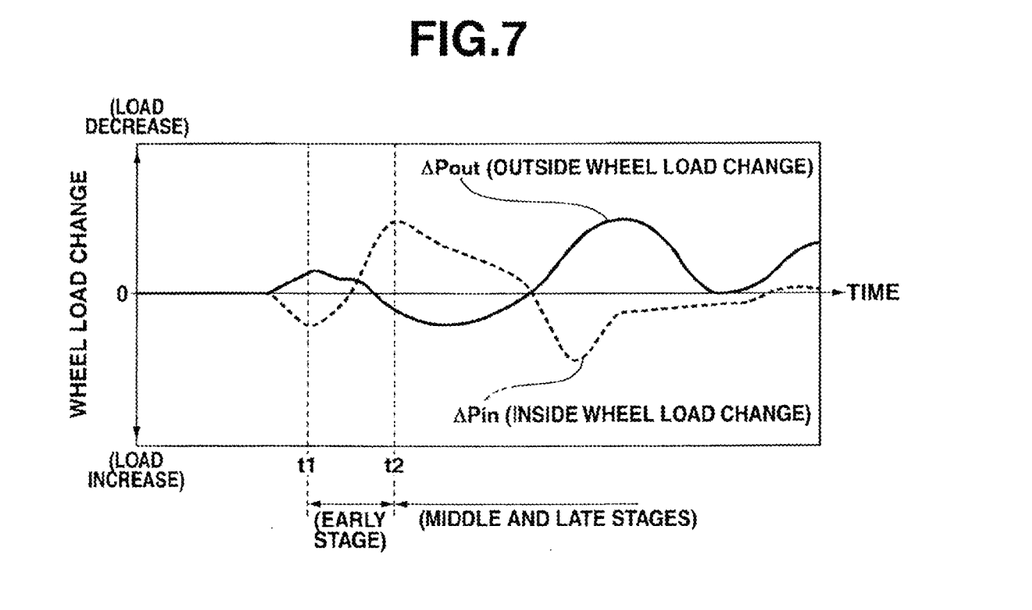
FIG. 7 is a time chart showing load changes in time of inside and outside wheels when the steered condition vehicle behavior improving control of FIG. 2 is performed.

Specifically, in the case where the steered condition motor driving force control of FIG. 2 is performed, the load to outside wheel during cornering changes as indicated by ΔPout in FIG. 7 after time instant t1 when the steering operation is started, with respect to the case where the steered condition motor driving force control of FIG. 2 is not performed. Simultaneously, the load to inside wheel during cornering changes as indicated by ΔPin in FIG. 7 after time instant t1 when the steering operation is started, with respect to the case where the steered condition motor driving force control of FIG. 2 is not performed. Especially after time instant t2 in FIG. 7 (during the middle and late stages), outside wheel load change ΔPout and inside wheel load change ΔPin are increased by the motor torque reducing correction at Step S16 of FIG. 2.

Figure 8A:
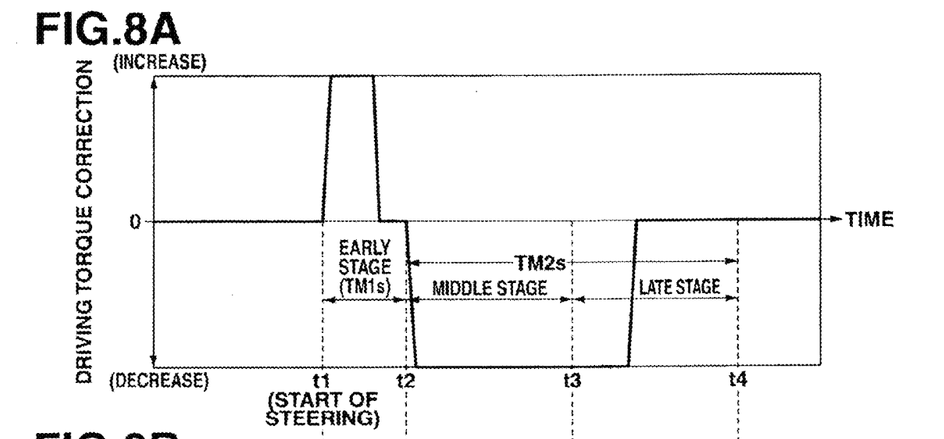
FIG. 8A is a time chart showing a change in time of driving torque correction.
Figure 8B:
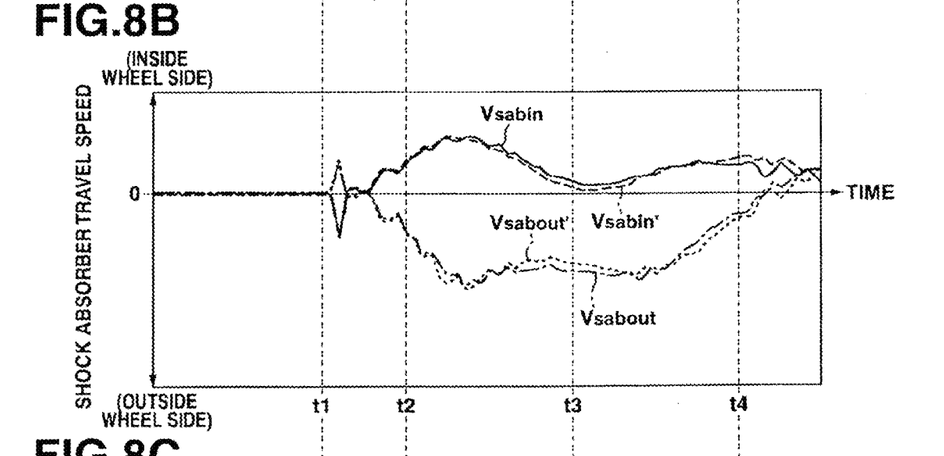
FIG. 8B is a time chart showing a change in time of travel speed of a shock absorber, in comparison with a case in which the steered condition vehicle behavior improving control of FIG. 2 is not performed.

The outside wheel load change ΔPout and inside wheel load change ΔPin serve to raise the rolling speed of the vehicle, so that of the shock absorbers associated with left and right front wheels 1L, 1R, the travel speed of the outside wheel shock absorber Vsabout is made to be faster than outside wheel shock absorber travel speed Vsabout' for the case where the steered condition motor driving force control of FIG. 2 is not performed, during the middle and late stages after time instant t2 as shown in FIG. 8B, whereas the inside wheel shock absorber travel speed Vsabin is made to be faster than inside wheel shock absorber travel speed Vsabin' for the case where the steered condition motor driving force control of FIG. 2 is not performed, during the middle and late stages after time instant t2 as shown in FIG. 8B.

Incidentally, a shock absorber generates an oscillation damping force by resistance of replacing flow of working fluid flowing through an orifice provided in a piston, during stroke of the shock absorber. Accordingly, as the travel speed increases, the oscillation damping force increases to generate a larger force to suppress the rolling of the vehicle.

In the case where the steered condition motor driving force control of FIG. 2 is not performed, outside wheel shock absorber travel speed Vsabout' and inside wheel shock absorber travel speed Vsabin' are slow during the middle and late stages after time instant t2 as shown in FIG. 8B. Accordingly, in the case where the steered condition motor driving force control of FIG. 2 is not performed, the roll suppressing force based on the oscillation damping force of the shock absorber during that period is relatively small, and the suspension stroke is relatively large in the case of the electric vehicle, so that the roll angle remains large as indicated by a broken line in FIG. 8C, causing a problem that the roll feel of the vehicle is bad during steering operation.

In contrast, in the case where the steered condition motor driving force control of FIG. 2 is performed as in the present embodiment, for the reasons described above, outside wheel shock absorber travel speed Vsabout is made to be faster than outside wheel shock absorber travel speed Vsabout' for the case where the steered condition motor driving force control of FIG. 2 is not performed, during the middle and late stages after time instant t2 as shown in FIG. 8B, whereas the inside wheel shock absorber travel speed Vsabin is made to be faster than inside wheel shock absorber travel speed Vsabin' for the case where the steered condition motor driving force control of FIG. 2 is not performed, during the middle and late stages after time instant t2 as shown in FIG. 8B. Accordingly, during that period, the roll suppressing force based on the oscillation damping force of the shock absorber increases, so that the roll angle can be made small as indicated by a solid line in FIG.

Figure 8C:
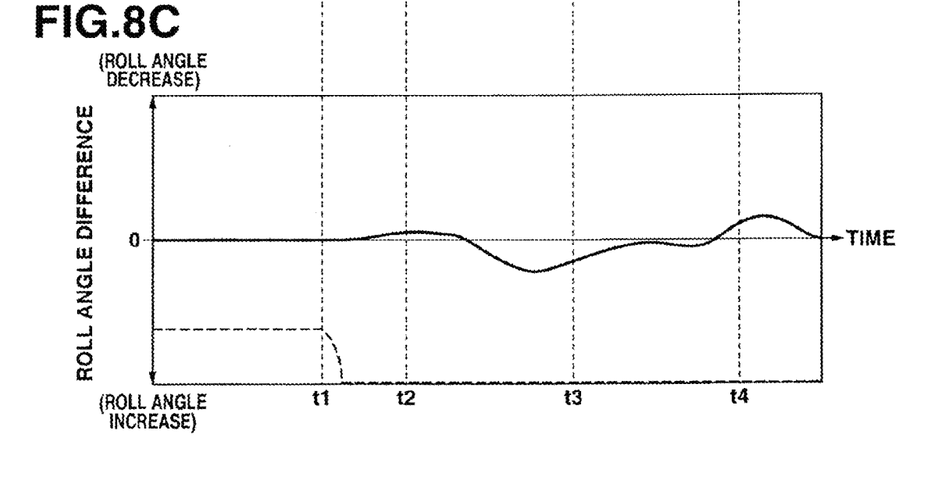
FIG. 8C is a time chart showing a change in time of difference in roll angle, in comparison with a case in which the steered condition vehicle behavior improving control of FIG. 2 is not performed.

8C, improving the roll feel of the vehicle during steering operation, even in the case where the vehicle is an electric vehicle in which the suspension stroke is large.

Improvement in the roll feel of the vehicle can be obtained also by the motor torque increasing correction during the early stage from time instant t1 to time instant t2 described with reference to FIG. 3A. Namely, although not shown in the drawings, the motor torque increasing correction during the early stage from time instant t1 to time instant t2 is such that the passenger fails to perceive acceleration, however causing a temporary increase in vehicle speed during the early stage and the first half of the middle stage.

The temporary rise in vehicle speed serves to maintain the pitch angle of the vehicle to a value at time instant t1 when steering operation is started, during the early stage and the first half of the middle stage. The holding of the pitch angle causes that the difference in roll angle between left and right front wheels 1L, 1R is set to a value in a direction to reduce the roll angle during the early stage and the first half of the middle stage, thus preventing the vehicle from rolling immediately after time instant t1 when steering operation is started, and thus improving the roll feel of the vehicle immediately after steering operation is started.

As clearly understood from the foregoing description, the present embodiment serves to obtain the effect of improving vehicle behavior during steering operation, without causing a change in suspension rigidity or damping performance of a shock absorber, and thereby achieve the aimed object, without causing a new problem about oscillation and noise by increasing the spring coefficient of a suspension device, and without causing a problem of cost rise by adding a damping force adjusting mechanism and others.

The feature of the present embodiment that the determination whether or not steering operation is performed at Step S11 of FIG. 2 is implemented by checking based on the difference in road wheel speed among road wheels whether or not steering operation of left and right front wheels 1L, 1R is performed, allows to quickly complete the determination about steering operation, as compared to cases where the determination is implemented by detecting the steering angle, and also allows the motor torque increasing and reducing correction to be performed with high response, thereby further ensuring the functions and effects described above.

Moreover, the feature of the present embodiment that the quantity of motor torque increasing correction is maintained for a predetermined time period as indicated by a torque waveform from time instant t1 to time instant t2 in FIG. 3A, during the steered condition motor torque increasing correction performed at Step S12 of FIG. 2, serves to maintain the motor torque to a value increased at steering operation for the predetermined time period, and thereby obtain the functions and effects described above for the long time period, and improve the steering response and roll feel of the vehicle during the predetermined time period after time instant t1 when steering operation is performed.

Furthermore, the feature of the present embodiment that during the steered condition motor torque reducing correction performed at Step S16 after it is determined at Step S14 that the motor torque increasing correction is performed just for the predetermined time period TM1s, the amount of motor torque reducing correction is maintained for the predetermined time period as indicated by a torque waveform from time instant t2 to time instant t4 in FIG. 3A, serves to maintain the motor torque to a reduced value for the predetermined time period after time instant t2 when the predetermined time period TM1s has elapsed. This serves to make functions and effects to continue for a longer time period, wherein the functions and effects are the functions and effects of the steered condition motor torque reducing correction described above, i.e. functions and effects of making the yawing behavior have a linear characteristic while suppressing the vehicle from rolling. This enhances reliably the steered condition vehicle behavior during the middle and late stages after time instant t2.

<Other Embodiment(s)> Although the foregoing describes the example with reference to the drawings in which the present invention is applied to the vehicle in which steerable left and right front wheels 1L, 1R are driven, the present invention may be applied to a vehicle in which left and right rear wheels are driven by a motor instead of or in addition to left and right front wheels 1L, 1R, or may be applied to a vehicle in which road wheels are driven by their respective electric motors. Also in such cases, it is clear that the functions and effects described above can be obtained by the driving force increasing and reducing correction control of FIG. 2.

Incidentally, the power source for driving road wheels is not limited to a rotary electric power source such as electric motor 2, but may be an engine such as an internal combustion engine. Also in such cases, the functions and effects described above can be obtained by the driving force increasing and reducing correction control of FIG. 2. However, engines are lower in control response than rotary power sources, so that it is advantageous that the driving force increasing and reducing correction control of FIG. 2 is applied to a rotary electric power source, to ensure the functions and effects described above.

The invention claimed is:

1. A steered condition vehicle behavior improving apparatus for a vehicle configured to run with a road wheel driven by a driving force from a power source, the steered condition vehicle behavior improving apparatus comprising:
   a steering operation detecting means that detects a steering operation of turning a steerable wheel of the vehicle; and
   a driving force reducing means that
      obtains detection information from the steering operation detecting means,
      determines a set time period that is a time period commencing after detection of the steering operation by the steering operation detecting means,
      awaits a lapse of the set time period after the steering operation is detected by the steering operation detecting means, and
      temporarily reduces the driving force to the road wheel upon the lapse of the set time period.

2. The steered condition vehicle behavior improving apparatus as claimed in claim 1, wherein
   the steering operation detecting means detects the steering operation based on a difference in rotational speed among a plurality of road wheels of the vehicle.

3. The steered condition vehicle behavior improving apparatus as claimed in claim 1, wherein
   the driving force reducing means holds the driving force at a driving force value obtained by reduction of the driving force for a predetermined time period after the set time period has elapsed after detection of the steering operation.

4. The steered condition vehicle behavior improving apparatus as claimed in claim 1, wherein
   the set time period is a time period for which steering response is requested.

5. The steered condition vehicle behavior improving apparatus as claimed in claim 1, wherein the reduction of the driving force is such that a passenger of the vehicle fails to perceive deceleration.

6. The steered condition vehicle behavior improving apparatus as claimed in claim 1, wherein:
the vehicle is an electric vehicle in which at least part of the driving force is supplied by an electric motor; and
the driving force reducing means controls the reduction of the driving force through the electric motor.

7. A steered condition vehicle behavior improving apparatus for a vehicle configured to run with a road wheel driven by a driving force from a power source, the steered condition vehicle behavior improving apparatus comprising:
a steering operation detecting section configured to detect a steering operation of turning a steerable wheel of the vehicle; and
a driving force reducing section configured to
obtain detection information from the steering operation detecting section,
determine a set time period that is a time period commencing after detection of the steering operation by the steering operation detecting section,
await a lapse of the set time period after the steering operation is detected by the steering operation detecting section, and
temporarily reduce the driving force to the road wheel upon the lapse of the set time period.

8. The steered condition vehicle behavior improving apparatus as claimed in claim 7, wherein
the steering operation detecting section is configured to detect the steering operation based on a difference in rotational speed among a plurality of road wheels of the vehicle.

9. The steered condition vehicle behavior improving apparatus as claimed in claim 7, wherein
the driving force reducing section is configured to hold the driving force at a driving force value obtained by reduction of the driving force for a predetermined time period after the set time period has elapsed after detection of the steering operation.

10. The steered condition vehicle behavior improving apparatus as claimed in claim 7, wherein
the set time period is a time period for which steering response is requested.

11. The steered condition vehicle behavior improving apparatus as claimed in claim 7, wherein
the reduction of the driving force is such that a passenger of the vehicle fails to perceive deceleration.

12. The steered condition vehicle behavior improving apparatus as claimed in claim 7, wherein:
the vehicle is an electric vehicle in which at least part of the driving force is supplied by an electric motor, and
the driving force reducing section is configured to control the reduction of the driving force through the electric motor.

13. A steered condition vehicle behavior improving apparatus for a vehicle configured to run with a road wheel driven by a driving force from a power source, the steered condition vehicle behavior improving apparatus comprising:
a steering operation detecting section configured to detect a steering operation of steering a steerable wheel of the vehicle; and
a driving force correction section configured to temporarily increase the driving force to the road wheel prior to a lapse of a set time period after the steering operation is detected by the steering operation detecting section, and temporarily reduce the driving force to the road wheel upon the lapse of the set time period.

* * * * *